United States Patent [19]

Arnold

[11] 4,291,295
[45] Sep. 22, 1981

[54] VEHICLE SPEED ENFORCEMENT SIGNAL

[76] Inventor: Robert D. Arnold, 1505 N. Quinn St., Apt. 17, Arlington, Va. 22209

[21] Appl. No.: 147,009

[22] Filed: May 6, 1980

Related U.S. Application Data

[63] Continuation-in-part of Ser. No. 955,297, Oct. 27, 1978, Pat. No. 4,250,487.

[51] Int. Cl.³ ............................................. G08B 21/00
[52] U.S. Cl. ....................................... 340/53; 340/62; 340/670; 180/171
[58] Field of Search ........................... 340/53, 62, 670; 180/170, 171, 275, 277, 279

[56] References Cited

U.S. PATENT DOCUMENTS 3,203,501  8/1965  Carter et al. .................. 180/171
3,800,904  4/1974  Zelenka ........................ 180/170

Primary Examiner—Alvin H. Waring
Attorney, Agent, or Firm—Robert D. Arnold

[57] ABSTRACT

In an on-board sensible signal that is activated by the speedometer of a vehicle when the vehicle speed exceeds a predetermined threshold and that remains activated when the speed is reduced below this threshold, the improvement consists of a combination of timing and logic circuitry that deactivates the signal when and only when the vehicle stops and remains at rest for a predetermined period of time.

6 Claims, 3 Drawing Figures

VEHICLE SPEED ENFORCEMENT SIGNAL

This application is a continuation-in-part of my co-pending application Ser. No. 955,297 filed Oct. 27, 1978, now U.S. Pat. No. 4,250,487.

BACKGROUND OF THE INVENTION

This invention pertains to the field of on-board signals responsive to the speed of vehicles. Within that field it relates to signals that are activated when the vehicle exceeds a predetermined speed and that remain activated when the vehicle speed is then reduced below the predetermined speed. In particular, it is in the class of such signals that are constituted so that they may be deactivated or otherwise nullified only by a means that can be used to cause some penalty to the driver of the vehicle.

The prior art contains devices in which the signal forms a permanent record such as a counter that is incremented, or a recording medium that is marked, by each incident of excessive speed. These signals cannot be deactivated but they can be nullified by enforcement authorities who may extract a penalty, such as a fine, on the basis of the record and then provide certification of nullification so that one incident of speeding cannot again be penalized.

In another class of enforcement signals known in the prior art, the signal can be deactivated but only by equipment that is intended to be possessed only by enforcement authorities.

There is also in the prior art a class of signals that are accompanied by physical actions that in themselves provide penalties. One example is a device that shuts off the vehicle engine for a period of time. Another is a device that, upon excessive speed, blows fuses that are necessary for normal operation of the vehicle and for which replacements are intended to be obtainable only from enforcement authorities.

No on-board enforcement signal means can be expected universally to be effective in reducing incidents of speeding unless its installation is mandatory. While this is a political rather than a technical matter, political considerations may be affected by: cost of both the on-board equipment and any auxilliary equipment or record keeping required; convenience and ease of use; reliability and maintainability; tamper resistance; and whether any physical penalty accompanying the signal introduces in itself a possible hazard. For this reason it is worth considering alternative enforcement signal means that may, upon installation, be less effective or demand less severe penalties but that may be more likely to become politically acceptable.

My U.S. Pat. No. 4,250,487 discloses an enforcement signal that is deactivated after a fixed time interval after the vehicle stops. The penalty is merely to stop and then avoid detection of the signal until the time runs out. But the vehicle may be driven, below the threshold speed to prevent signal reactivation, during the period of detection avoidance while the timer runs out.

The present invention is an improvement that prevents deactivation of the signal unless the vehicle remains at rest for the entire fixed time interval.

SUMMARY OF THE INVENTION

This invention is a signal, for installation in a vehicle, that is activated in response to the vehicle speedometer when the vehicle exceeds a predetermined speed and that is deactivated only by keeping the vehicle at rest for a fixed period of time.

Its purpose is to assist in the enforcement of a universal maximum speed limit. Any driver who exceeds this limit by some predetermined margin would cause the signal to be turned on and would risk prosecution if the signal is detected by enforcement authorities. If the vehicle is stopped by such authorities, for any reason, the signal will remain on for the fixed period of time, which period should therefore be set long enough to insure that it will be observed by them. To turn off the signal to avoid its possible detection, a driver must stop and remain stopped for the fixed period of time, which period should therefore be set long enough to be a genuine inconvenience.

While this device extracts a relatively mild penalty for its deactivation, it may have the advantage of being relatively more likely to be adopted as a mandatory measure, compared to presently known enforcement signals, due to the considerations mentioned in the previous section. It can consist exclusively of electronic solid-state components and requires no moving parts. It requires no external equipment and is simple and easy to use. It does not interfere with the normal operation of the vehicle.

DETAILED DESCRIPTION OF THE INVENTION

Figure 1:
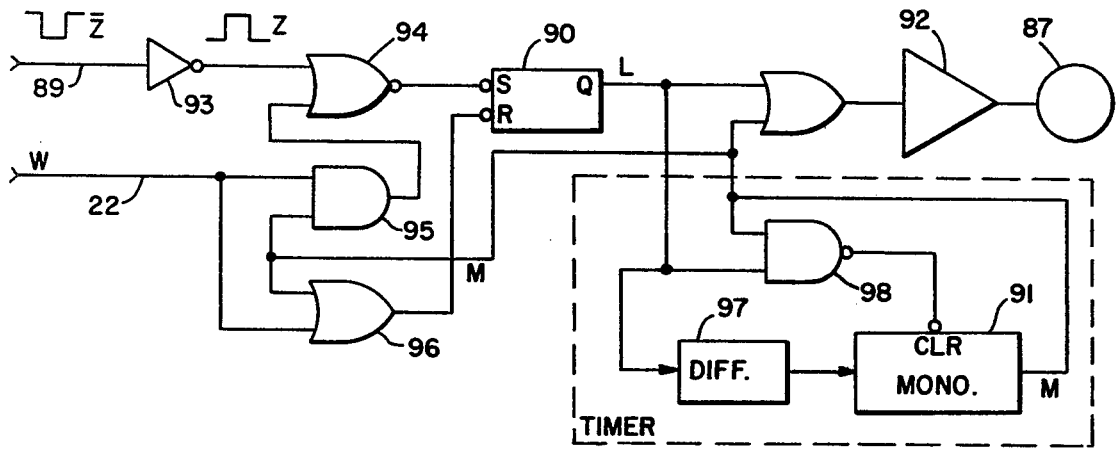
FIG. 1 is a logic diagram of one embodiment of the invention.

The circuit of one embodiment of the improvement represented by this invention is depicted in FIG. 1. This figure is adapted from FIG. 13 of my U.S. Pat. No. 4,250,487 and employs the same reference numerals for corresponding components. The enforcement signal 87 can be a light, or an annoying audible signal, that is turned on when a signal corresponding to logical 1 is input to amplifier 92. Thus, signal 87 is on if either the output L of $\overline{S}$-$\overline{R}$ latch 90 or the output M of monostable 91 is at logical 1.

Input $\overline{Z}$ on lead 89 is normally at logical 1. A negative pulse appears on lead 89 when the speed of the vehicle in which the device is installed exceeds a predetermined threshold. A method of producing this pulse, based on decoding the output of a digital speedometer, is disclosed in U.S. Pat. No. 4,250,487. Inverter 93 produces a positive pulse, signal Z, as one of the inputs to NOR 94.

The second input to the system, signal W on lead 22, is at logical 1 when the vehicle is moving and is at logical 0 when the vehicle is at rest. A method of generating this signal from a digital speedometer is disclosed in U.S. Pat. No. 4,240,487. The output M of monostable 91 is at logical 1 when the monostable is running.

As is shown in FIG. 1, NOR 94 and AND 95 cause latch 90 to be set, meaning that its output goes to logical 1, when $Z + W \cdot M = 1$. OR 96 causes latch 90 to be reset, and L to go to logical 0, when $W + M = 0$. Monostable 91 is triggered, and begins its timed run of output $M = 1$, when output L of latch 90 goes from logical 1 to logical 0 and this negative transition is differentiated by differentiator 97. NAND 98 immediately resets the monostable to $M = 0$ if $L \cdot M = 1$.

The operation of the system may be seen by considering the possible states, LMW, of the system and the transitions between states brought about by possible events that can occur. The eight possible states, with their corresponding values of L, M, and W are shown at the top of the table.

Even-numbered states, W=0, correspond to the vehicle being at rest. In states 2-7 the signal is activated because L+M=1.

The row headings in the lower part of the table are the possible independent events that can occur. If the vehicle moves W goes to 1, if the vehicle stops W goes to 0, if the monostable ends its timed run M goes to 0, and if the vehicle speeds L goes to 1. Transitions of L to 0 and M to 1 are not independent events; they occur only in response to other events. The last row is to allow for spontaneous transitions which will be discussed below. Each tabular entry in the lower part of the table is the system state that will result when the event shown by the row heading occurs while the system is in the state shown by the column heading. Impossible events are indicated by tabular entry X. For example, the event of speeding is not possible if the system is in an even state because in even states the vehicle is at rest.

We first examine unstable states 3, 4, 6, and 7. In state 3(LMW=011), M·W=1 so AND 95, acting through NOR 94, sets latch 90, thus causing L to go to 1 and the system to enter state 7(111) immediately. This is indicated in the last row of the table. No other event can occur in state 3 because this state vanishes as soon as it is created.

In state 4(100), M+W=0 so OR 96 resets latch 90, thus causing L to go to 0 and the system to enter state 0(000) immediately. But the negative transition of L triggers monostable 91 causing M to go to 1 and the system to enter state 2(010) immediately, as shown in the table.

| SYSTEM STATES AND TRANSITIONS | | | | | | | | |
|---|---|---|---|---|---|---|---|---|
| State : | 0 | 1 | 2 | 3 | 4 | 5 | 6 | 7 |
| L : | 0 | 0 | 0 | 0 | 1 | 1 | 1 | 1 |
| M : | 0 | 0 | 1 | 1 | 0 | 0 | 1 | 1 |
| W : | 0 | 1 | 0 | 1 | 0 | 1 | 0 | 1 |
| Move W = 1 : | 1 | X | 3 | X | X | X | X | X |
| Stop W = 0 : | X | 0 | X | X | X | 4 | X | X |
| Time Ends M = 0 : | X | X | 0 | X | X | X | X | X |
| Speed L = 1 : | X | 5 | X | X | X | 5 | X | X |
| Spontaneous : | X | X | X | 7 | 2 | X | 4 | 5 |

In state 6(110), L·M=1 so gate 98 clears the monostable causing M to go to 0 and the system to go to state 4, as shown in the table. State 4 will then decay to state 2, as explained above.

In state 7(111), L·M=1 and this causes M to go to 0, as was the case in state 6, thus putting the system into state 5. State 5 is stable.

Now the result of each possible event can be determined directly from the table. As an example of a one-step transition, moving the car while the system is in state 0(000) will cause W to go to 1 thus putting the system into state 1(001) which is a stable state. If an event puts the system into an unstable state there will be an immdiate further transition to another state. For example, stopping the car, and thus causing W to go to 0, while the system is in state 5(101) will cause a transition to state 4(100) which will decay immediately to state 2(010) as explained above and shown in the table.

The three-step transition that occurs when the car is moved from state 2, causing W to go to 1, is seen from the table to be: 2 to 3 to 7 to 5.

The event of exceeding the speed threshold, causing Z to go momentarily to 1 and thus putting a 0 on the output of NOR 94, causes latch 90 to be set and L to go to 1 if the latch is not already at L=1. As is seen in the table, this can occur only when the system is in state 1 since L is already at 1 in state 5.

Figure 2:
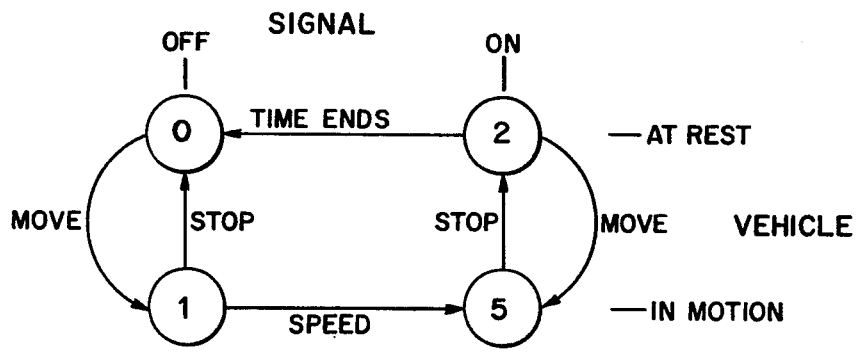
FIG. 2 shows all possible transitions between the logical states of the system.

With the aid of the table we can now examine the consequences of all possible events. We begin with the system in state 0. The car is at rest and both the monostable and the latch are off. The signal is therefore off. The table shows that the only way out of state 0 is to move the car and enter state 1, signal still off. This event and state transition are shown in FIG. 2.

From state 1 there are two possibilities: stop the car and return to state 0 or speed and enter state 5. Entering state 5 turns on the signal. The only way out of 5 is to stop and enter 2, signal still on. Remaining at rest until the end of the timed run of the monostable will take the system back to state 0 but moving the car during this time will cause transition back to state 5.

In summary, once the system has entered signal-on state 5 because of excess speed there is no way back to a signal-off state, 0 or 1, except via state 2. In state 2 the vehicle is at rest. Furthermore, the only way into state 2 is via 5. In this two-step transition from 5 to 2, as described in the analysis of the table, the monostable begins its timed run the moment the system enters state 2 via intermediate unstable state 4. It is therefore necessary to remain in state 2, at rest, for the full period of the monostable in order to achieve the signal-off state 0.

Monostable 91 must be one, such as the Signetics SE555 in its monostable mode, that is capable of a long timing run. If the speedometer system used in conjunction with this invention contains an oscillator it is possible to use a counter instead of a monostable to establish the time period. Although this would require more semiconductor gates, it would eliminate the capacitors and resistors that would be needed for both monostable 91 and differentiator 97 and could thus improve reliability and reduce the physical size of the device.

Figure 3:
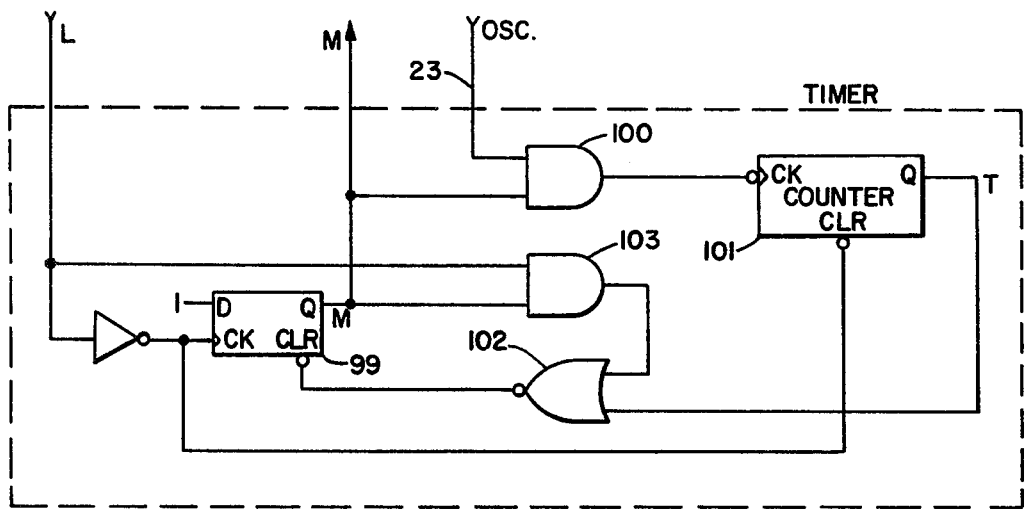
FIG. 3 shows an alternate embodiment of the timer.

FIG. 3 shows a timer that uses a counter in place of the monostable. The components enclosed in the dashed-line box of FIG. 3 replace those within the dashed-line box of FIG. 1. Input L and output M of the timer are to be connected to the remainder of the system exactly as in FIG. 1. An additional input, derived from the speedometer oscillator, is shown as lead 23.

In operation, a negative transition of output L of latch 90 is inverted and clocks D-type FF 99, whose D input is permanently at logical 1, into state M=1. This provides the timer output M and it also enables AND 100 thus causing counter 101 to begin counting the signal on lead 23. When counter 101 reaches a count that is half of its modulus its output T, which is the logic level of the MSB of the counter, will go to logical 1. Acting through NOR 102, this logical 1 will clear FF 99 and thus reset M to 0. This will disable the counter clock by means of gate 100. It will be necessary to remove the clear signal from FF 99 before the next negative transition of L arrives to restart the counter. This is done by applying $\overline{L}$ to the clear input of counter 101, causing T to go to 0.

AND 103 serves the same function as NAND 98 in the embodiment of FIG. 1, which is to make system states 6 and 7, in which L·M=1, unstable. In the embodiment of FIG. 3 this is done by applying L·M through NOR 102 to clear FF 99, causing M to go to logical 0. This clear signal is immediately removed when M goes to 0, so that FF 99 will be ready for the next arrival of a negative transition of L. Each time that a negative transition of L starts the counter, the count will begin at zero since L=1 before the transition will have cleared the counter.

It is seen that the signal M behaves the same in the embodiment of FIG. 3 as in the embodiment of FIG. 1. It is activated only by a negative transition of L and may be deactivated either by L·M=1 or by reaching the end of the timed run. Both embodiments therefore correspond to the same state transition table.

In the embodiment of FIG. 3 the duration of the timed run is seen to be equal to half the modulus of counter 101 divided by the frequency of the signal on lead 23. This signal can be taken directly from the speedometer oscillator but the use of this relatively high-frequency signal would require a very large modulus, and correspondingly a large number of gates, in counter 101 to achieve a long enough timer-on duration. If the speedometer contains an oscillator-based signal of lower frequency then this lower-frequency signal can advantageously be used on lead 23 to reduce the required modulus. Most digital speedometers contain a signal that establishes the sampling frequency and that is in the range of 1 to 10 hertz. In the disclosure of U.S. Pat. No. 4,250,487 there is a signal on lead 23 that has a frequency of the order of one hertz.

I claim:

1. A vehicle speed monitoring device, comprising:
   means, connected to the speedometer of said vehicle, for indicating that said vehicle has exceeded a predetermined speed;
   timing means, attached to said indicating means, for extending the activation period of said indicating means;
   means, connected to the speedometer of said vehicle, for generating a signal that is active when said vehicle is in motion; and
   logic means, connected to said signal generating means, to said indicating means, and to said timing means, for deactivating said indicating means when said vehicle stops and remains at rest for a predetermined period of time.

2. A monitoring device as in claim 1 wherein said indicating means includes a latch that is set by an electrical signal generated by said speedometer and further includes a sensible signal that is activated by said latch.

3. A monitoring device as in claim 2 wherein said timing means is a monostable that is triggered by the resetting of said latch and that activates said sensible signal.

4. A monitoring device as in claim 3 wherein said logic means is disposed to set said latch when said vehicle is in motion while said monostable is active and to reset said latch when said vehicle is at rest while said monostable is inactive.

5. A monitoring device as in claim 2 wherein said timing means includes a counter that is driven by an oscillator contained in said speedometer, that is started by the resetting of said latch, that is stopped by reaching a predetermined count, and that activates said sensible signal while counting.

6. A monitoring device as in claim 5 wherein said logic means is disposed to set said latch when said vehicle is in motion while said counter is active and to reset said latch when said vehicle is at rest while said counter is inactive.

* * * * *